(12) United States Patent
Glasco

(10) Patent No.: US 7,653,790 B2
(45) Date of Patent: *Jan. 26, 2010

(54) METHODS AND APPARATUS FOR RESPONDING TO A REQUEST CLUSTER

(76) Inventor: David B. Glasco, 10337 Ember Glen Dr., Austin, TX (US) 78726

( * ) Notice: Subject to any disclaimer, the term of this patent is extended or adjusted under 35 U.S.C. 154(b) by 849 days.

This patent is subject to a terminal disclaimer.

(21) Appl. No.: 10/145,438

(22) Filed: May 13, 2002

(65) Prior Publication Data

US 2003/0210655 A1 Nov. 13, 2003

(51) Int. Cl.
*G06F 12/00* (2006.01)

(52) U.S. Cl. .................. 711/146; 711/118; 711/128; 711/141; 711/144; 711/145; 711/147; 711/148

(58) Field of Classification Search .............. 711/141, 711/144–147, 128
See application file for complete search history.

(56) References Cited

U.S. PATENT DOCUMENTS

| | | | |
|---|---|---|---|
| 5,195,089 A | | 3/1993 | Sindhu et al. |
| 5,659,710 A | | 8/1997 | Sherman et al. |
| 5,893,151 A | * | 4/1999 | Merchant ............... 711/140 |
| 5,958,019 A | | 9/1999 | Hagersten et al. |
| 5,966,729 A | * | 10/1999 | Phelps .................. 711/146 |
| 6,038,644 A | * | 3/2000 | Irie et al. .............. 711/141 |
| 6,067,603 A | | 5/2000 | Carpenter et al. |
| 6,141,692 A | * | 10/2000 | Loewenstein et al. ...... 709/234 |
| 6,167,492 A | | 12/2000 | Keller et al. ............ 711/154 |
| 6,292,705 B1 | | 9/2001 | Wang et al. |
| 6,295,583 B1 | * | 9/2001 | Razdan et al. .......... 711/137 |
| 6,336,169 B1 | | 1/2002 | Arimille et al. |
| 6,338,122 B1 | * | 1/2002 | Baumgartner et al. ..... 711/141 |
| 6,351,791 B1 | | 2/2002 | Freerksen et al. |
| 6,374,331 B1 | * | 4/2002 | Janakiraman et al. ...... 711/141 |
| 6,385,705 B1 | | 5/2002 | Keller et al. ............ 711/154 |
| 6,490,661 B1 | | 12/2002 | Keller et al. ............ 711/150 |
| 6,615,319 B2 | | 9/2003 | Khare et al. |
| 6,631,401 B1 | | 10/2003 | Keller et al. |
| 6,631,448 B2 | * | 10/2003 | Weber ................... 711/141 |
| 6,633,945 B1 | * | 10/2003 | Fu et al. ................ 710/316 |
| 6,728,843 B1 | * | 4/2004 | Pong et al. ............. 711/150 |
| 6,754,782 B2 | | 6/2004 | Arimilli et al. |
| 6,760,819 B2 | | 7/2004 | Dhong et al. |

(Continued)

OTHER PUBLICATIONS

Alan Charesworth, "Starfire: extending the SMP envelope", publish in Feb. 1998 by IEEE, pp. 39-49.*

(Continued)

*Primary Examiner*—Tuan V Thai
*Assistant Examiner*—Zhuo H Li

(57) ABSTRACT

According to the present invention, methods and apparatus are provided for increasing the efficiency of data access in a multiple processor, multiple cluster system. A home cluster of processors receives a cache access request from a request cluster. The home cluster includes mechanisms for instructing probed remote clusters to respond to the request cluster instead of to the home cluster. The home cluster can also include mechanisms for reducing the number of probes sent to remote clusters. Techniques are also included for providing the requesting cluster with information to determine the number of responses to be transmitted to the requesting cluster as a result of the reduction in the number of probes sent at the home cluster.

35 Claims, 15 Drawing Sheets

U.S. PATENT DOCUMENTS

| | | | | |
|---|---|---|---|---|
| 6,799,252 B1 * | 9/2004 | Bauman | ................ | 711/149 |
| 6,839,808 B2 * | 1/2005 | Gruner et al. | ................ | 711/130 |
| 6,973,543 B1 * | 12/2005 | Hughes | ................ | 711/141 |
| 2002/0053004 A1 * | 5/2002 | Pong | ................ | 711/119 |
| 2003/0095557 A1 * | 5/2003 | Keller et al. | ................ | 370/412 |

OTHER PUBLICATIONS

*HyperTransport™ I/O Link Specification Revision 1.03*, HyperTransport™ Consortium, Oct. 10, 2001, Copyright © 2001 HyperTransport Technology Consortium.

U.S. Appl. No. 10/106,426, Office Action dated Sep. 22, 2004.
U.S. Appl. No. 10/106,426, Office Action dated Mar. 7, 2005.
U.S. Appl. No. 10/106,426, Office Action dated Jul. 21, 2005.
U.S. Appl. No. 10/106,426, Office Action dated Nov. 21, 2005.
U.S. Appl. No. 10/106,430, Office Action dated Sep. 23, 2004.
U.S. Appl. No. 10/106,430, Office Action dated Mar. 10, 2005.
U.S. Appl. No. 10/106,430, Office Action dated Jul. 21, 2005.
U.S. Appl. No. 10/106,430, Office Action dated Nov. 2, 2005.
U.S. Appl. No. 10/106,299, Office Action dated Sep. 22, 2004.
U.S. Appl. No. 10/106,299, Office Action dated Mar. 10, 2005.
U.S. Appl. No. 10/106,299, Office Action dated Jul. 21, 2005.
U.S. Appl. No. 10/106,299, Office Action dated Nov. 21, 2005.
U.S. Appl. No. 10/145,439, Office Action dated Nov. 21, 2005.
U.S. Appl. No. 10/106,426, filed Mar. 22, 2002, Notice of Allowance, mailed Apr. 21, 2006.
U.S. Appl. No. 10/106,426, filed Mar. 22, 2002, Allowed claims.
U.S. Appl. No. 10/106,430, filed Mar. 22, 2002, Notice of Allowance mailed Apr. 21, 2006.
U.S. Appl. No. 10/106,430, filed Mar. 22, 2002, Allowed claims.
U.S. Appl. No. 10/106,299, filed Mar. 22, 2002, Notice of Allowance mailed Apr. 28, 2006.
U.S. Appl. No. 10/106,299, filed Mar. 22, 2002, Allowed claims.
U.S. Appl. No. 10/145,439, filed May 13, 2002, Office Action mailed Aug. 13, 2007.
U.S. Appl. No. 10/145,439, filed May 13, 2002, Office Action mailed Apr. 17, 2007.
U.S. Appl. No. 10/145,439, filed May 13, 2002, Office Action mailed Aug. 22, 2006.
U.S. Appl. No. 10/145,439, filed May 13, 2002, Office Action mailed May 5, 2006.
U.S. Appl. No. 10/145,439, Notice of Allowance mailed Feb. 26, 2008.
U.S. Appl. No. 10/145,439, Allowed Claims, as of Feb. 26, 2008.

* cited by examiner

METHODS AND APPARATUS FOR RESPONDING TO A REQUEST CLUSTER

CROSS-REFERENCE TO RELATED APPLICATIONS

The present application is related to filed U.S. application Ser. No. 10/106,426 titled Methods And Apparatus For Speculative Probing At A Request Cluster, U.S. application Ser. No. 10/106,430 titled Methods And Apparatus For Speculative Probing With Early Completion And Delayed Request, and U.S. application Ser. No. 10/106,299 titled Methods And Apparatus For Speculative Probing With Early Completion And Early Request, the entireties of which are incorporated by reference herein for all purposes. The present application is also related to concurrently filed U.S. application Ser. No. 10/145,439 titled Methods And Apparatus For Responding To A Request Cluster by David B. Glasco, the entirety of which is incorporated by reference for all purposes.

BACKGROUND OF THE INVENTION

1. Field of the Invention

The present invention generally relates to accessing data in a multiple processor system. More specifically, the present invention provides techniques for improving data access efficiency while maintaining cache coherency in a multiple processor system having a multiple cluster architecture.

2. Description of Related Art

Data access in multiple processor systems can raise issues relating to cache coherency. Conventional multiple processor computer systems have processors coupled to a system memory through a shared bus. In order to optimize access to data in the system memory, individual processors are typically designed to work with cache memory. In one example, each processor has a cache that is loaded with data that the processor frequently accesses. The cache is read or written by a processor. However, cache coherency problems arise because multiple copies of the same data can co-exist in systems having multiple processors and multiple cache memories. For example, a frequently accessed data block corresponding to a memory line may be loaded into the cache of two different processors. In one example, if both processors attempt to write new values into the data block at the same time, different data values may result. One value may be written into the first cache while a different value is written into the second cache. A system might then be unable to determine what value to write through to system memory.

A variety of cache coherency mechanisms have been developed to address such problems in multiprocessor systems. One solution is to simply force all processor writes to go through to memory immediately and bypass the associated cache. The write requests can then be serialized before overwriting a system memory line. However, bypassing the cache significantly decreases efficiency gained by using a cache. Other cache coherency mechanisms have been developed for specific architectures. In a shared bus architecture, each processor checks or snoops on the bus to determine whether it can read or write a shared cache block. In one example, a processor only writes an object when it owns or has exclusive access to the object. Each corresponding cache object is then updated to allow processors access to the most recent version of the object.

Bus arbitration is used when both processors attempt to write the same shared data block in the same clock cycle. Bus arbitration logic decides which processor gets the bus first. Although, cache coherency mechanisms such as bus arbitration are effective, using a shared bus limits the number of processors that can be implemented in a single system with a single memory space.

Other multiprocessor schemes involve individual processor, cache, and memory systems connected to other processors, cache, and memory systems using a network backbone such as Ethernet or Token Ring. Multiprocessor schemes involving separate computer systems each with its own address space can avoid many cache coherency problems because each processor has its own associated memory and cache. When one processor wishes to access data on a remote computing system, communication is explicit. Messages are sent to move data to another processor and messages are received to accept data from another processor using standard network protocols such as TCP/IP. Multiprocessor systems using explicit communication including transactions such as sends and receives are referred to as systems using multiple private memories. By contrast, multiprocessor system using implicit communication including transactions such as loads and stores are referred to herein as using a single address space.

Multiprocessor schemes using separate computer systems allow more processors to be interconnected while minimizing cache coherency problems. However, it would take substantially more time to access data held by a remote processor using a network infrastructure than it would take to access data held by a processor coupled to a system bus. Furthermore, valuable network bandwidth would be consumed moving data to the proper processors. This can negatively impact both processor and network performance.

Performance limitations have led to the development of a point-to-point architecture for connecting processors in a system with a single memory space. In one example, individual processors can be directly connected to each other through a plurality of point-to-point links to form a cluster of processors. Separate clusters of processors can also be connected. The point-to-point links significantly increase the bandwidth for coprocessing and multiprocessing functions. However, using a point-to-point architecture to connect multiple processors in a multiple cluster system sharing a single memory space presents its own problems.

Consequently, it is desirable to provide techniques for improving data access and cache coherency in systems having multiple clusters of multiple processors connected using point-to-point links.

SUMMARY OF THE INVENTION

According to the present invention, methods and apparatus are provided for increasing the efficiency of data access in a multiple processor, multiple cluster system. A home cluster of processors receives a cache access request from a request cluster. The home cluster includes mechanisms for instructing probed remote clusters to respond to the request cluster instead of to the home cluster. The home cluster can also include mechanisms for reducing the number of probes sent to remote clusters. Techniques are also included for providing the requesting cluster with information to determine the number of responses to be transmitted to the requesting cluster as a result of the reduction in the number of probes sent from the home cluster.

According to various embodiments, a computer system is provided. A home cluster includes a first plurality of processors and a home cache coherence controller. The first plurality of processors and the home cache coherence controller are interconnected in a point-to-point architecture. The home cache coherence controller is configured to send a probe to a remote cluster upon receiving a cache access request from a request cluster. The probe includes information for the request cache coherence controller to determine the number of probe responses corresponding to the cache access request to be transmitted to the request cluster.

According to other embodiments, a method for managing data access is provided. A request is transmitted to a home cluster comprising a plurality of processors coupled to a home cache coherence controller. A probe is received from the home cluster. The probe corresponds to the request and includes information for determining the number of expected probe responses. A plurality of probe responses is received from a plurality of clusters.

A further understanding of the nature and advantages of the present invention may be realized by reference to the remaining portions of the specification and the drawings.

BRIEF DESCRIPTION OF THE DRAWINGS

The invention may best be understood by reference to the following description taken in conjunction with the accompanying drawings, which are illustrative of specific embodiments of the present invention.

DETAILED DESCRIPTION OF SPECIFIC EMBODIMENTS

Figure 1A:
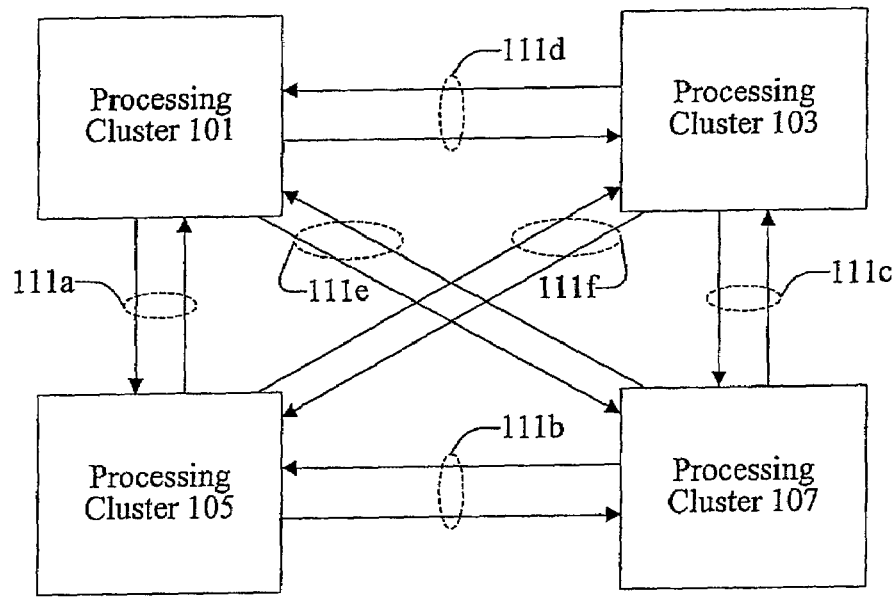
FIGS. 1A and 1B are diagrammatic representation depicting a system having multiple clusters.

Reference will now be made in detail to some specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. Multi-processor architectures having point-to-point communication among their processors are suitable for implementing specific embodiments of the present invention. In the following description, numerous specific details are set forth in order to provide a thorough understanding of the present invention. The present invention may be practiced without some or all of these specific details. Well known process operations have not been described in detail in order not to unnecessarily obscure the present invention. Furthermore, the present application's reference to a particular singular entity includes that possibility that the methods and apparatus of the present invention can be implemented using more than one entity, unless the context clearly dictates otherwise.

Techniques are provided for increasing data access efficiency in a multiple processor, multiple cluster system. In a point-to-point architecture, a cluster of processors includes multiple processors directly connected to each other through point-to-point links. By using point-to-point links instead of a conventional shared bus or external network, multiple processors are used efficiently in a system sharing the same memory space. Processing and network efficiency are also improved by avoiding many of the bandwidth and latency limitations of conventional bus and external network based multiprocessor architectures. According to various embodiments, however, linearly increasing the number of processors in a point-to-point architecture leads to an exponential increase in the number of links used to connect the multiple processors. In order to reduce the number of links used and to further modularize a multiprocessor system using a point-to-point architecture, multiple clusters are used.

According to various embodiments, the multiple processor clusters are interconnected using a point-to-point architecture. Each cluster of processors includes a cache coherence controller used to handle communications between clusters. In one embodiment, the point-to-point architecture used to connect processors are used to connect clusters as well.

By using a cache coherence controller, multiple cluster systems can be built using processors that may not necessarily support multiple clusters. Such a multiple cluster system can be built by using a cache coherence controller to represent non-local nodes in local transactions so that local nodes do not need to be aware of the existence of nodes outside of the local cluster. More detail on the cache coherence controller will be provided below.

In a single cluster system, cache coherency can be maintained by sending all data access requests through a serialization point. Any mechanism for ordering data access requests is referred to herein as a serialization point. One example of a serialization point is a memory controller. Various processors in the single cluster system send data access requests to the memory controller. In one example, the memory controller is configured to serialize or lock the data access requests so that only one data access request for a given memory line is allowed at any particular time. If another processor attempts to access the same memory line, the data access attempt is blocked until the memory line is unlocked. The memory controller allows cache coherency to be maintained in a multiple processor, single cluster system.

A serialization point can also be used in a multiple processor, multiple cluster system where the processors in the various clusters share a single address space. By using a single address space, internal point-to-point links can be used to significantly improve intercluster communication over traditional external network based multiple cluster systems. Various processors in various clusters send data access requests to a memory controller associated with a particular cluster such as a home cluster. The memory controller can similarly serialize all data requests from the different clusters. However, a serialization point in a multiple processor, multiple cluster system may not be as efficient as a serialization point in a multiple processor, single cluster system. That is, delay resulting from factors such as latency from transmitting between clusters can adversely affect the response times for various data access requests. It should be noted that delay also results from the use of probes in a multiple processor environment.

Although delay in intercluster transactions in an architecture using a shared memory space is significantly less than the delay in conventional message passing environments using external networks such as Ethernet or Token Ring, even minimal delay is a significant factor. In some applications, there may be millions of data access requests from a processor in a fraction of a second. Any delay can adversely impact processor performance.

According to various embodiments, speculative probing is used to increase the efficiency of accessing data in a multiple processor, multiple cluster system. A mechanism for eliciting a response from a node to maintain cache coherency in a system is referred to herein as a probe. In one example, a mechanism for snooping a cache is referred to as a probe. A response to a probe can be directed to the source or target of the initiating request. Any mechanism for sending probes to nodes associated with cache blocks before a request associated with the probes is received at a serialization point is referred to herein as speculative probing.

According to various embodiments, the reordering or elimination of certain data access requests do not adversely affect cache coherency. That is, the end value in the cache is the same whether or not snooping occurs. For example, a local processor attempting to read the cache data block can be allowed to access the data block without sending the requests through a serialization point in certain circumstances. In one example, read access can be permitted when the cache block is valid and the associated memory line is not locked. Techniques for performing speculative probing generally are described in U.S. application Ser. No. 10/106,426 titled Methods And Apparatus For Speculative Probing At A Request Cluster, U.S. application Ser. No. 10/106,430 titled Methods And Apparatus For Speculative Probing With Early Completion And Delayed Request, and U.S. application Ser. No. 10/106,299 titled Methods And Apparatus For Speculative Probing With Early Completion And Early Request, the entireties of which are incorporated by reference herein for all purposes. By completing a data access transaction within a local cluster, the delay associated with transactions in a multiple cluster system can be reduced or eliminated.

The techniques of the present invention recognize that other efficiencies can be achieved, particularly when speculative probing can not be completed at a local cluster. In one example, a cache access request is forwarded from a local cluster to a home cluster. A home cluster then proceeds to send probes to remote clusters in the system. In typical implementations, the home cluster gatherers the probe responses corresponding to the probe before sending an aggregated response to the request cluster. The aggregated response typically includes the results of the home cluster probes and the results of the remote cluster probes. The techniques of the present invention provide techniques for more efficiently aggregating responses at the request cluster instead of a home cluster. According to various embodiments, remote clusters send probe responses directly to the request cluster instead of sending the probe responses to the request cluster through a home cluster. In one embodiment, techniques are provided for enabling a home cluster to send a reduced number of probes to remote clusters. Mechanisms are provided for allowing a home cluster to inform the request cluster that a reduced number of probes are being transmitted. The mechanisms can be implemented in a manner entirely transparent to remote clusters.

FIG. 1A is a diagrammatic representation of one example of a multiple cluster, multiple processor system that can use the techniques of the present invention. Each processing cluster 101, 103, 105, and 107 can include a plurality of processors. The processing clusters 101, 103, 10S, and 107 are connected to each other through point-to-point links 111*a-f*. In one embodiment, the multiple processors in the multiple cluster architecture shown in FIG. 1A share the same memory space. In this example, the point-to-point links 111*a-f* are internal system connections that are used in place of a traditional front-side bus to connect the multiple processors in the multiple clusters 101, 103, 105, and 107. The point-to-point links may support any point-to-point coherence protocol.

Figure 1B:
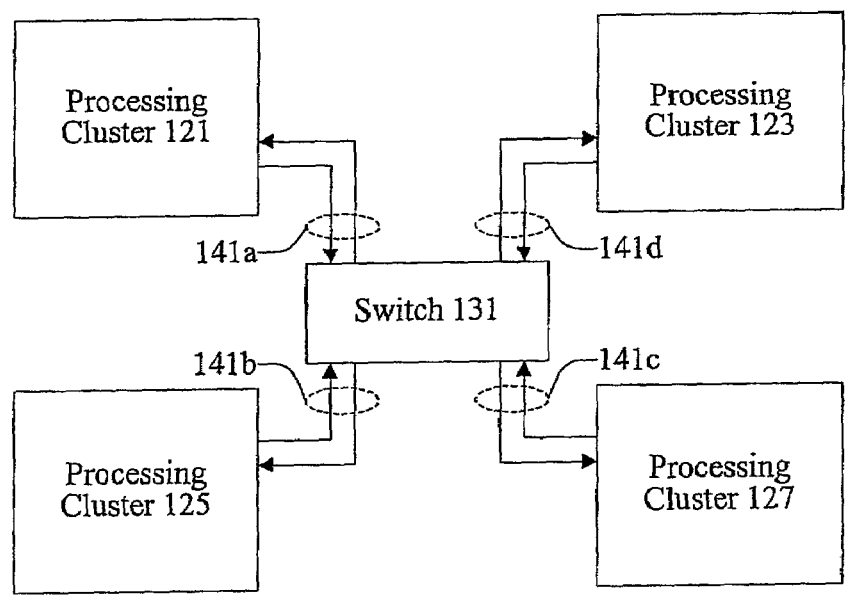

FIG. 1B is a diagrammatic representation of another example of a multiple cluster, multiple processor system that can use the techniques of the present invention. Each processing cluster 121, 123, 125, and 127 can be coupled to a switch 131 through point-to-point links 141*a-d*. It should be noted that using a switch and point-to-point links allows implementation with fewer point-to-point links when connecting multiple clusters in the system. A switch 131 can include a processor with a coherence protocol interface. According to various implementations, a multicluster system shown in FIG. 1A is expanded using a switch 131 as shown in FIG. 1B.

Figure 2:
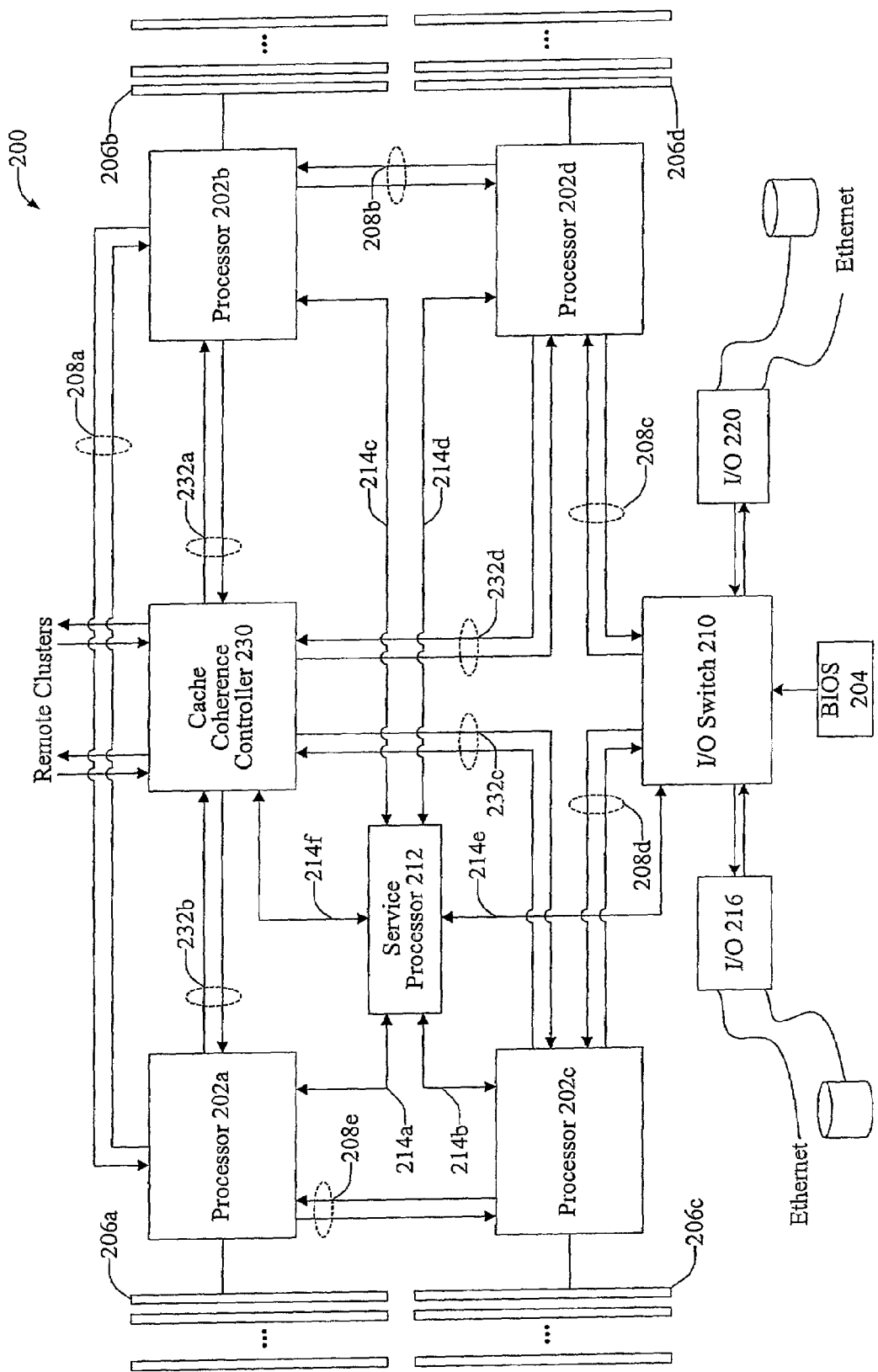
FIG. 2 is a diagrammatic representation of a cluster having a plurality of processors.

FIG. 2 is a diagrammatic representation of a multiple processor cluster, such as the cluster 101 shown in FIG. 1A. Cluster 200 includes processors 202*a*-202*d*, one or more Basic I/O systems (BIOS) 204, a memory subsystem comprising memory banks 206*a*-206*d*, point-to-point communication links 208*a*-208*e*, and a service processor 212. The point-to-point communication links are configured to allow interconnections between processors 202*a*-202*d*, I/O switch 210, and cache coherence controller 230. The service processor 212 is configured to allow communications with processors 202*a*-202*d*, I/O switch 210, and cache coherence controller 230 via a JTAG interface represented in FIG. 2 by links 214*a*-214*f*. It should be noted that other interfaces are supported. I/O switch 210 connects the rest of the system to I/O adapters 216 and 220.

According to specific embodiments, the service processor of the present invention has the intelligence to partition system resources according to a previously specified partitioning schema. The partitioning can be achieved through direct manipulation of routing tables associated with the system processors by the service processor which is made possible by the point-to-point communication infrastructure. The routing tables are used to control and isolate various system resources, the connections between which are defined therein. The service processor and computer system partitioning are described in patent application Ser. No. 09/932,456 titled Computer System Partitioning Using Data Transfer Routing Mechanism, filed on Aug. 16, 2001, the entirety of which is incorporated by reference for all purposes.

The processors 202*a-d* are also coupled to a cache coherence controller 230 through point-to-point links 232*a-d*. Any mechanism or apparatus that can be used to provide communication between multiple processor clusters while maintaining cache coherence is referred to herein as a cache coherence controller. The cache coherence controller 230 can be coupled to cache coherence controllers associated with other multiprocessor clusters. It should be noted that there can be more than one cache coherence controller in one cluster. The cache coherence controller 230 communicates with both processors 202a-d as well as remote clusters using a point-to-point protocol.

More generally, it should be understood that the specific architecture shown in FIG. 2 is merely exemplary and that embodiments of the present invention are contemplated having different configurations and resource interconnections, and a variety of alternatives for each of the system resources shown. However, for purpose of illustration, specific details of server 200 will be assumed. For example, most of the resources shown in FIG. 2 are assumed to reside on a single electronic assembly. In addition, memory banks 206a-206d may comprise double data rate (DDR) memory which is physically provided as dual in-line memory modules (DIMMs). I/O adapter 216 may be, for example, an ultra direct memory access (UDMA) controller or a small computer system interface (SCSI) controller which provides access to a permanent storage device. I/O adapter 220 may be an Ethernet card adapted to provide communications with a network such as, for example, a local area network (LAN) or the Internet.

According to a specific embodiment and as shown in FIG. 2, both of I/O adapters 216 and 220 provide symmetric I/O access. That is, each provides access to equivalent sets of I/O. As will be understood, such a configuration would facilitate a partitioning scheme in which multiple partitions have access to the same types of I/O. However, it should also be understood that embodiments are envisioned in which partitions without I/O are created. For example, a partition including one or more processors and associated memory resources, i.e., a memory complex, could be created for the purpose of testing the memory complex.

According to one embodiment, service processor 212 is a Motorola MPC855T microprocessor which includes integrated chipset functions. The cache coherence controller 230 is an Application Specific Integrated Circuit (ASIC) supporting the local point-to-point coherence protocol. The cache coherence controller 230 can also be configured to handle a non-coherent protocol to allow communication with I/O devices. In one embodiment, the cache coherence controller 230 is a specially configured programmable chip such as a programmable logic device or a field programmable gate array.

Figure 3:
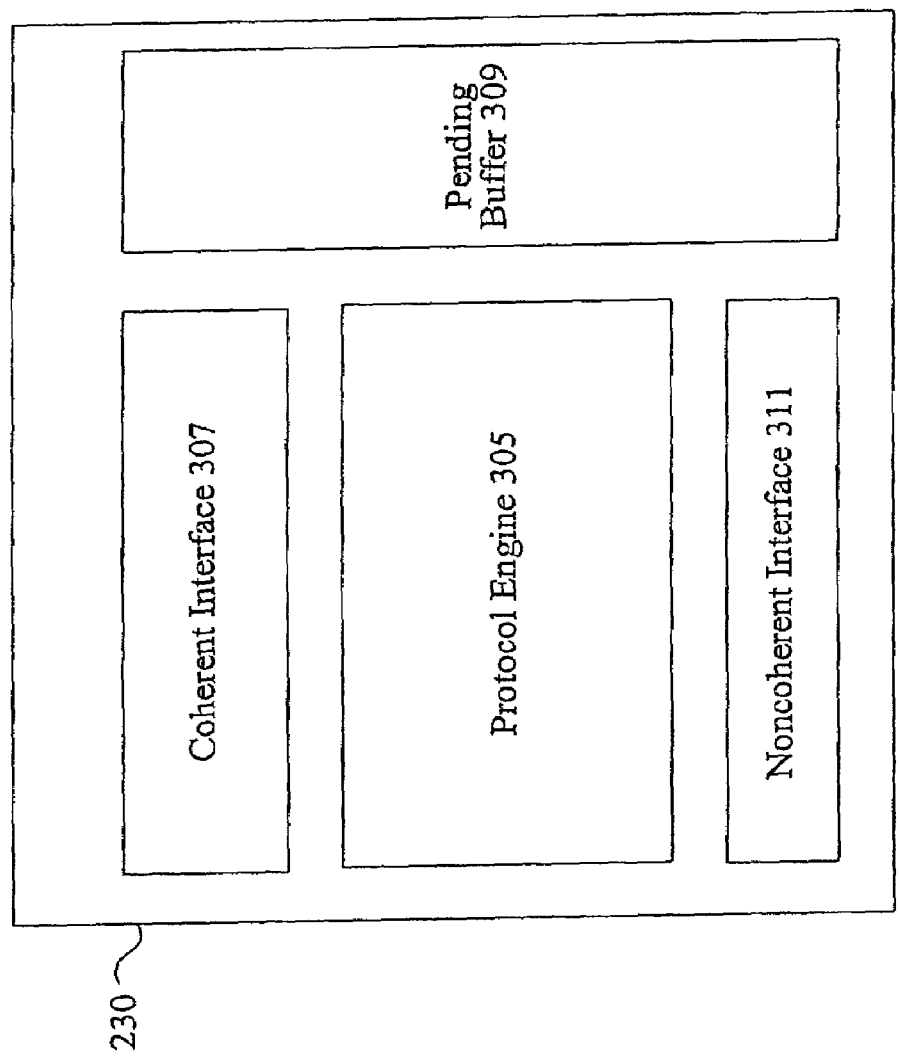
FIG. 3 is a diagrammatic representation of a cache coherence controller.

FIG. 3 is a diagrammatic representation of one example of a cache coherence controller 230. According to various embodiments, the cache coherence controller includes a protocol engine 305 configured to handle packets such as probes and requests received from processors in various clusters of a multiprocessor system. The functionality of the protocol engine 305 can be partitioned across several engines to improve performance. In one example, partitioning is done based on packet type (request, probe and response), direction (incoming and outgoing), or transaction flow (request flows, probe flows, etc).

The protocol engine 305 has access to a pending buffer 309 that allows the cache coherence controller to track transactions such as recent requests and probes and associate the transactions with specific processors. Transaction information maintained in the pending buffer 309 can include transaction destination nodes, the addresses of requests for subsequent collision detection and protocol optimizations, response information, tags, and state information.

The cache coherence controller has an interface such as a coherent protocol interface 307 that allows the cache coherence controller to communicate with other processors in the cluster as well as external processor clusters. According to various embodiments, each interface 307 and 311 is implemented either as a full crossbar or as separate receive and transmit units using components such as multiplexers and buffers. The cache coherence controller can also include other interfaces such as a non-coherent protocol interface 311 for communicating with I/O devices. It should be noted, however, that the cache coherence controller 230 does not necessarily need to provide both coherent and non-coherent interfaces. It should also be noted that a cache coherence controller in one cluster can communicate with a cache coherence controller in another cluster.

Figure 4:
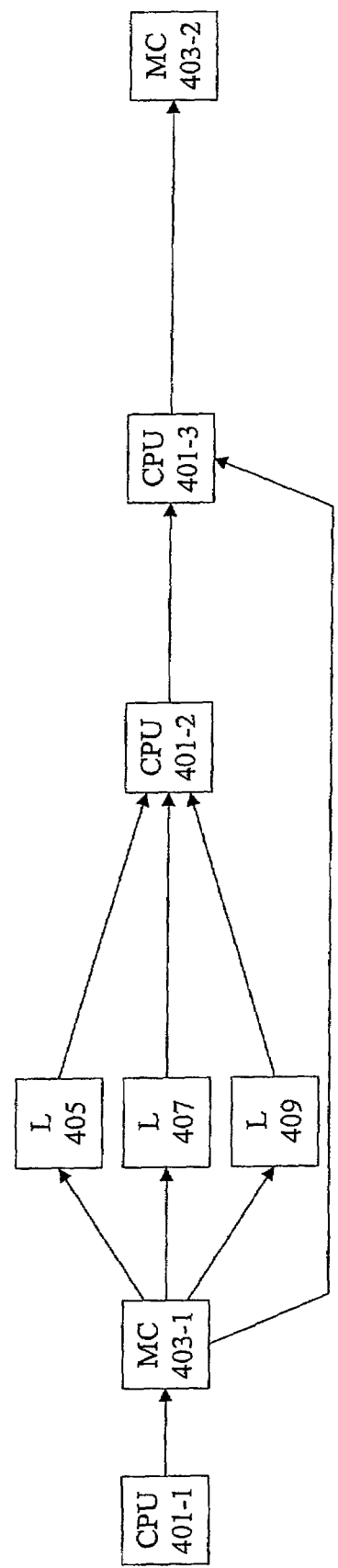
FIG. 4 is a diagrammatic representation showing a transaction flow for a data access request from a processor in a single cluster.

FIG. 4 is a diagrammatic representation showing the transactions for a cache request from a processor in a system having a single cluster without using a cache coherence controller. A processor 401-1 sends an access request such as a read memory line request to a memory controller 403-1. The memory controller 403-1 may be associated with this processor, another processor in the single cluster or may be a separate component such as an ASIC or specially configured Programmable Logic Device (PLD). To preserve cache coherence, only one processor is typically allowed to access a memory line corresponding to a shared address space at anyone given time. To prevent other processors from attempting to access the same memory line, the memory line can be locked by the memory controller 403-1. All other requests to the same memory line are blocked or queued. Access by another processor is typically only allowed when the memory controller 403-1 unlocks the memory line.

The memory controller 403-1 then sends probes to the local cache memories 405, 407, and 409 to determine cache states. The local cache memories 405, 407, and 409 then in turn send probe responses to the same processor 401-2. The memory controller 403-1 also sends an access response such as a read response to the same processor 401-3. The processor 401-3 can then send a done response to the memory controller 403-2 to allow the memory controller 403-2 to unlock the memory line for subsequent requests. It should be noted that CPU 401-1, CPU 401-2, and CPU 401-3 refer to the same processor.

FIGS. 5A-5D are diagrammatic representations depicting cache coherence controller operation. The use of a cache coherence controller in multiprocessor clusters allows the creation of a multiprocessor, multicluster coherent domain without affecting the functionality of local nodes such as processors and memory controllers in each cluster. In some instances, processors may only support a protocol that allows for a limited number of processors in a single cluster without allowing for multiple clusters. The cache coherence controller can be used to allow multiple clusters by making local processors believe that the non-local nodes are merely a single local node embodied in the cache coherence controller. In one example, the processors in a cluster do not need to be aware of processors in other clusters. Instead, the processors in the cluster communicate with the cache coherence controller as though the cache coherence controller were representing all non-local nodes.

It should be noted that nodes in a remote cluster will be referred to herein as non-local nodes or as remotes nodes. However, non-local nodes refer to nodes not in a request cluster generally and includes nodes in both a remote cluster and nodes in a home cluster. A cluster from which a data access or cache access request originates is referred to herein as a request cluster. A cluster containing a serialization point is referred to herein as a home cluster. Other clusters are referred to as remote clusters. The home cluster and the remote cluster are also referred to herein as non-local clusters.

Figure 5A:
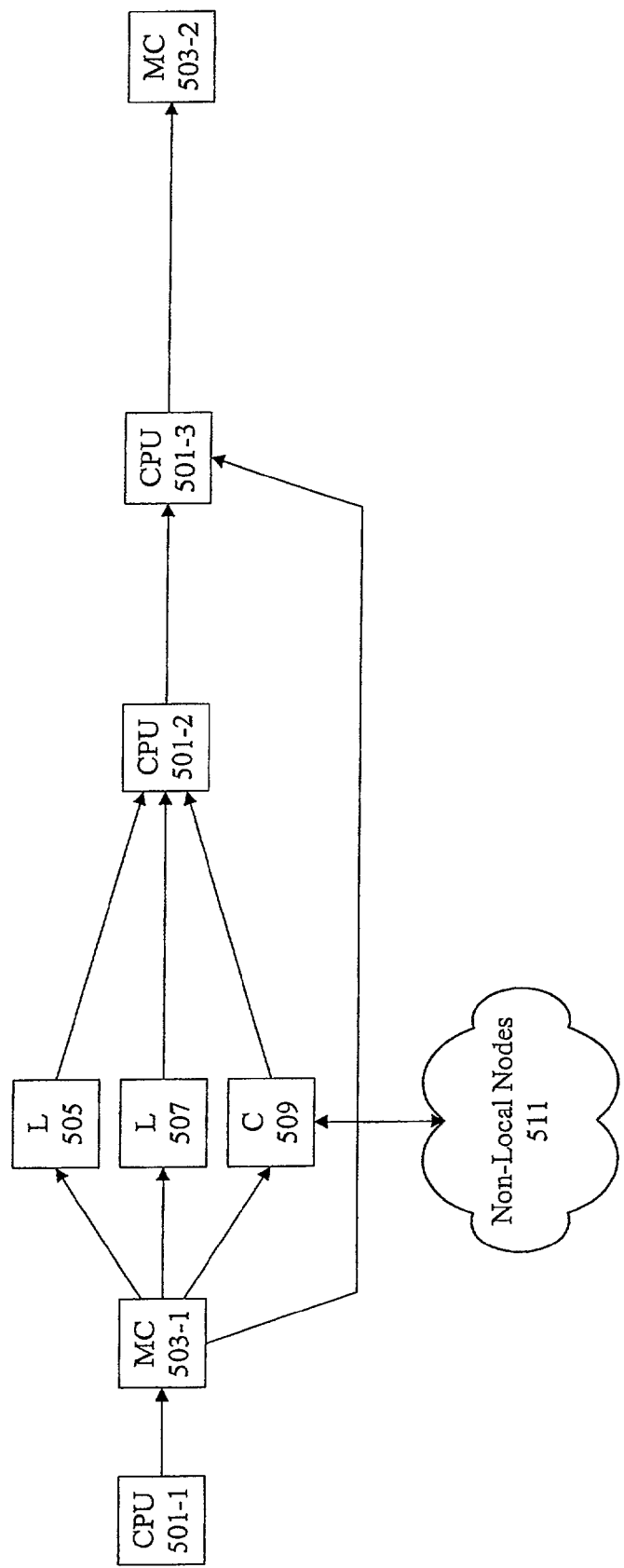
FIGS. 5A-5D are diagrammatic representations showing cache coherence controller functionality.

FIG. 5A shows the cache coherence controller acting as an aggregate remote cache. When a processor 501-1 generates a data access request to a local memory controller 503-1, the cache coherence controller 509 accepts the probe from the local memory controller 503-1 and forwards it to non-local node portion 511. It should be noted that a coherence protocol can contain several types of messages. In one example, a coherence protocol includes four types of messages; data or cache access requests, probes, responses or probe responses, and data packets. Data or cache access requests usually target the home node memory controller. Probes are used to query each cache in the system. The probe packet can carry information that allows the caches to properly transition the cache state for a specified line. Responses are used to carry probe response information and to allow nodes to inform other nodes of the state of a given transaction. Data packets carry request data for both write requests and read responses.

According to various embodiments, the memory address resides at the local memory controller. As noted above, nodes including processors and cache coherence controllers outside of a local cluster are referred to herein as non-local nodes. The cache coherence controller 509 then accumulates the response from the non-local nodes and sends a single response in the same manner that local nodes associated with cache blocks 505 and 507 send a single response to processor 501-2. Local processors may expect a single probe response for every local node probed. The use of a cache coherence controller allows the local processors to operate without concern as to whether non-local nodes exist.

It should also be noted that components such as processor 501-1 and processor 501-2 refer herein to the same component at different points in time during a transaction sequence. For example, processor 501-1 can initiate a data access request and the same processor 501-2 can later receive probe responses resulting from the request.

Figure 5B:
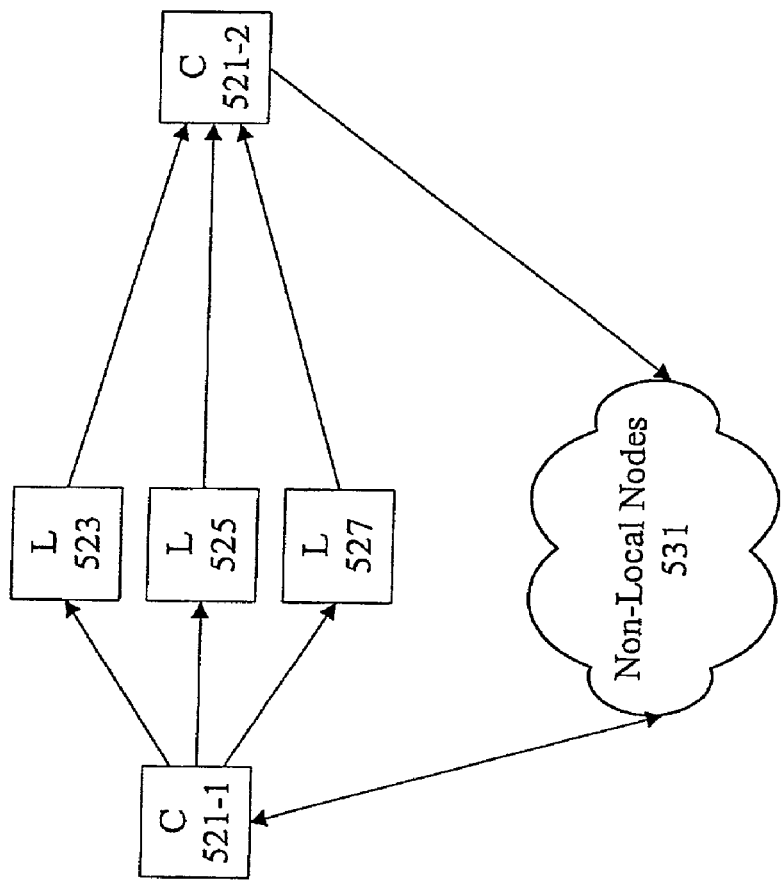

FIG. 5B shows the cache coherence controller acting as a probing agent pair. When the cache coherence controller 521-1 receives a probe from non-local nodes 531, the cache coherence controller 521-1 accepts the probe and forwards the probe to local nodes associated with cache blocks 523, 525, and 527. The cache coherence controller 521-2 then forwards a final response to the non-local node portion 531. In this example, the cache coherence controller is both the source and the destination of the probes. The local nodes associated with cache blocks 523, 525, and 527 behave as if the cache coherence controller were a local processor with a local memory request.

Figure 5C:
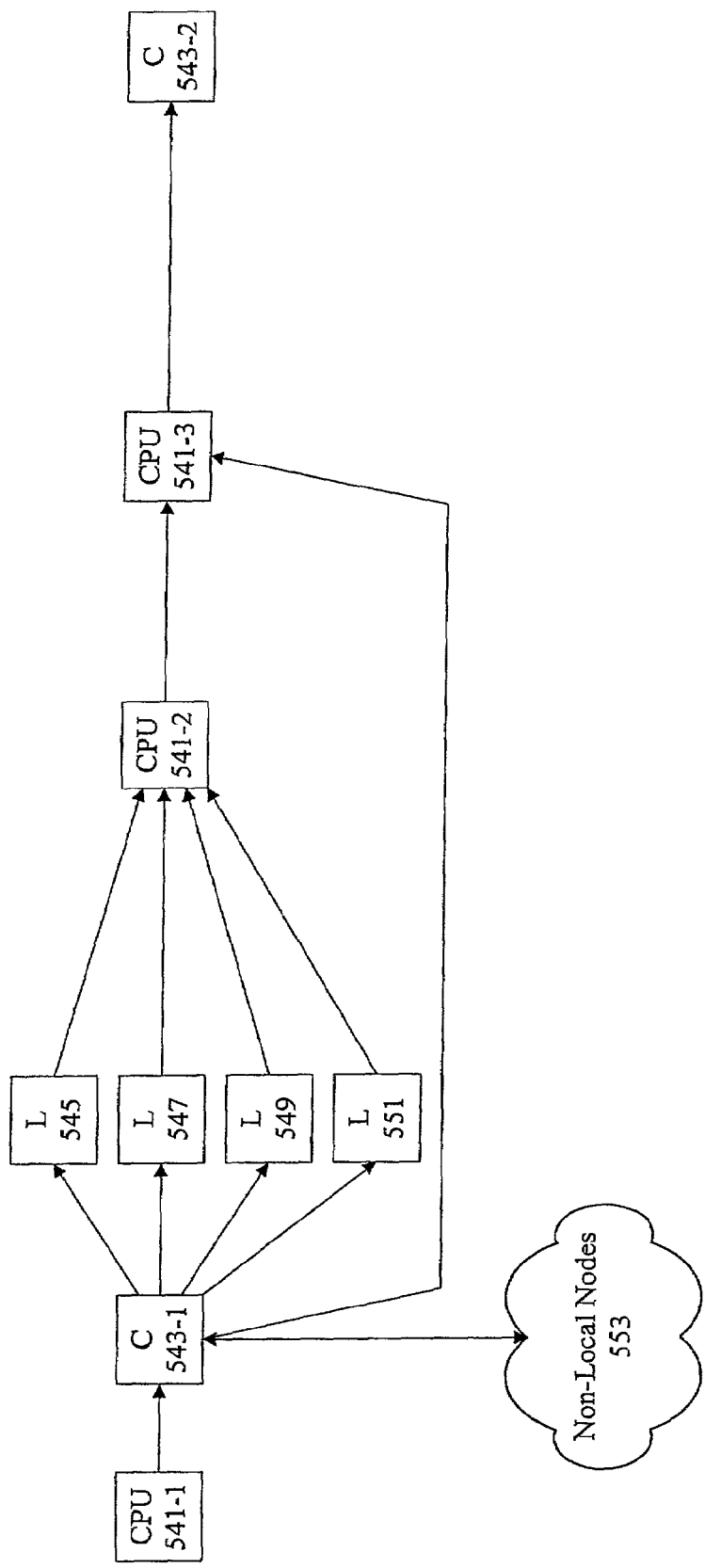

FIG. 5C shows the cache coherence controller acting as a remote memory. When a local processor 541-1 generates an access request that targets remote memory, the cache coherence controller 543-1 forwards the request to the non-local nodes 553. When the remote request specifies local probing, the cache coherence controller 543-1 generates probes to local nodes and the probed nodes provide responses to the processor 541-2. Once the cache coherence controller 543-1 has received data from the non-local node portion 553, it forwards a read response to the processor 541-3. The cache coherence controller also forwards the final response to the remote memory controller associated with non-local nodes 553.

Figure 5D:
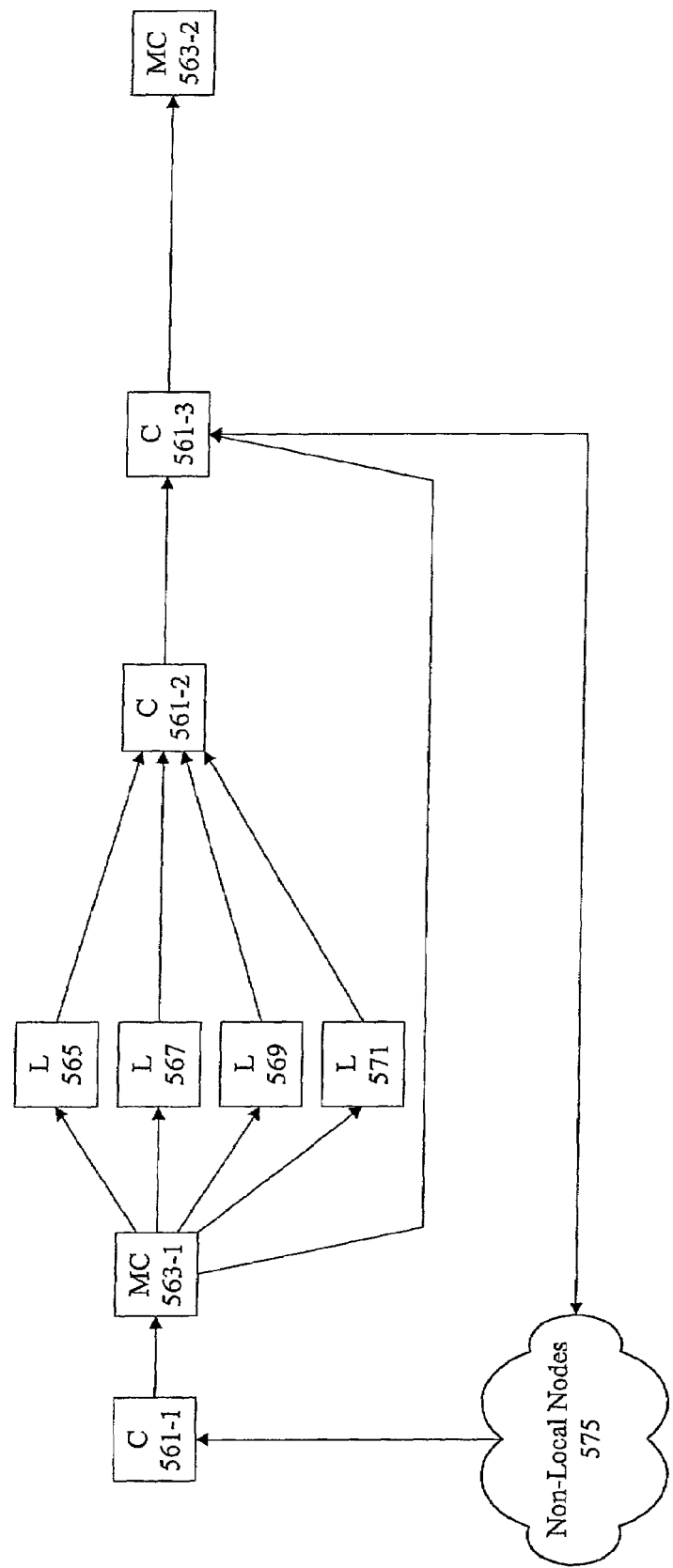

FIG. 5D shows the cache coherence controller acting as a remote processor. When the cache coherence controller 561-1 at a first cluster receives a request from a processor in a second cluster, the cache coherence controller acts as a first cluster processor on behalf of the second cluster processor. The cache coherence controller 561-1 accepts the request from portion 575 and forwards it to a memory controller 5631. The cache coherence controller 561-2 then accumulates all probe responses as well as the data fetched and forwards the final response to the memory controller 563-2 as well as to non-local nodes 575.

By allowing the cache coherence controller to act as an aggregate remote cache, probing agent pair, remote memory, and remote processor, multiple cluster systems can be built using processors that may not necessarily support multiple clusters. The cache coherence controller can be used to represent non-local nodes in local transactions so that local nodes do not need to be aware of the existence of nodes outside of the local cluster.

Figure 6:
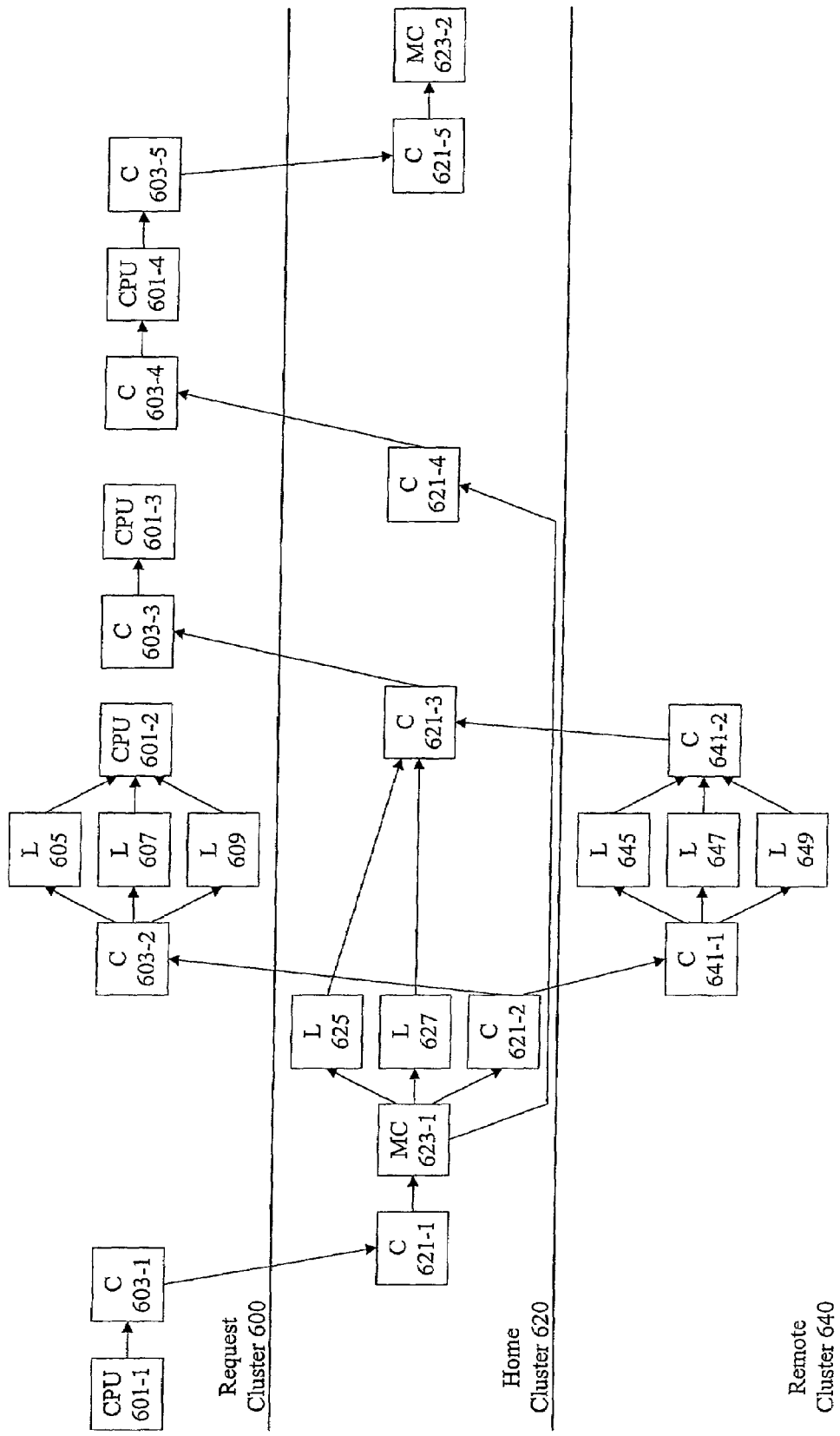
FIG. 6 is a diagrammatic representation depicting a transaction flow for a remote cluster sending a probe response to a home cluster.

FIG. 6 is a diagrammatic representation depicting the transactions for a data request from a local processor sent to a non-local cluster using a cache coherence controller. The multicluster system includes a request cluster 600, a home cluster 620, and a remote cluster 640. As noted above, the home cluster 620 and the remote cluster 640 as well as any other clusters excluding the request cluster 600 are referred to herein as non-local clusters. Processors and cache coherence controllers associated with local and non-local clusters are similarly referred to herein as local processors, local cache coherence controllers, non-local processors, and non-local cache coherence controllers, respectively.

According to various embodiments, processor 601-1 in a local cluster 600 sends a data access request such as a read request to a cache coherence controller 603-1. The cache coherence controller 603-1 tracks the transaction in the pending buffer of FIG. 3 and forwards the request to a cache coherence controller 621-1 in a home cluster 620. The cache coherence controller 621-1 at the home cluster 620 receives the access request and tracks the request in its pending buffer. In one example, information associated with the requests are stored in the pending buffer. The cache coherence controller 621-1 forwards the access request to a memory controller 623-1 also associated with the home cluster 620. At this point, the memory controller 623-1 locks the memory line associated with the request. In one example, the memory line is a unique address in the memory space shared by the multiple processors in the request cluster 600, home cluster 620, and the remote cluster 640. The memory controller 6231 generates a probe associated with the data access request and forwards the probe to local nodes associated with cache blocks 625 and 627 as well as to cache coherence controller 621-2.

It should be noted that although messages associated with requests, probes, responses, and data are described as forwarded from one node to another, the messages themselves may contain variations. In one example, alterations are made to the messages to allow the multiple cluster architecture to be transparent to various local nodes. It should be noted that write requests can be handled as well. In write requests, the targeted memory controller gathers responses and sends the responses to the processor when gathering is complete.

The cache coherence controller 641-1 associated with the remote cluster 640 receives a probe from cache coherence controller 621-2 and probes local nodes associated with cache blocks 645, 647, and 649. Similarly, the cache coherence controller 603-2 associated with the request cluster 600 receives a probe and forwards the probe to local nodes associated with cache blocks 605, 607, and 609 to probe the cache blocks in the request cluster 600. Processor 601-2 receives probe responses from the local nodes associated with cache blocks 605, 607, and 609.

According to various embodiments, cache coherence controller 621-3 accumulates probe responses and sends the probe responses to cache coherence controller 603-3, which in turn forwards the probe responses to the processor 601-3.

Cache coherence controller 621-4 also sends a read response to cache coherence controller 603-4, which forwards the read response to processor 601-4. While probes and probe responses carry information for maintaining cache coherency in the system, read responses can carry actual fetched data. After receiving the fetched data, processor 601-4 may send a source done response to cache coherence controller 603-5. According to various embodiments, the transaction is now complete at the requesting cluster 600. Cache coherence controller 603-5 forwards the source done message to cache coherence controller 621-5. Cache coherence controller 621-5 in turn sends a source done message to memory controller 623-2. Upon receiving the source done message, the memory controller 623-2 can unlock the memory line and the transaction at the home cluster 620 is now complete. Another processor can now access the unlocked memory line.

It should be noted that because the cache coherence controller 621-3 waits for remote cluster probe responses before sending a probe response to cache coherence controller 603-3, delay is introduced into the system. According to various embodiments, probe responses are gathered at cache coherence controller 603-3. By having remote clusters send probe responses through a home cluster, both home cluster probe responses and remote cluster probe responses can be delayed at the home cluster cache coherence controller. In one example, remote cluster probe responses have to travel an additional hop in order to reach a request cluster. The latency for transmission of a probe response between a remote cluster and a request cluster may be substantially less than the latency for transmission of a probe response between a remote cluster and a request cluster through a home cluster. Home cluster probe responses are also delayed as a result of this added hop.

As will be appreciated by one of skill in the art, the specific transaction sequences involving requests, probes, and response messages can vary depending on the specific implementation. In one example, a cache coherence controller 621-3 may wait to receive a read response message from a memory controller 623-1 before transmitting both a probe response message and a read response message to a cache coherence controller 603-3. In other examples, a cache coherence controller may be the actual processor generating the request. Some processors may operate as both a processor and as a cache coherence controller. Furthermore, various data access request messages, probes, and responses associated with reads and writes are contemplated. As noted above, any message for snooping a cache can be referred to as a probe. Similarly, any message for indicating to the memory controller that a memory line should be unlocked can be referred to as a source done message.

It should be noted that the transactions shown in FIG. 6 show examples of cache coherence controllers performing many different functions, including functions of remote processors, aggregate local caches, probing agent pairs, and remote memory as described with reference to FIGS. 5A-5D.

The cache coherence controller 621-1 at the home cluster 620 is acting as a remote processor. When the cache coherence controller receives a request from a request cluster processor, the cache coherence controller is directed to act as the requesting processor on behalf of the request cluster processor. In this case, the cache coherence controller 621-1 accepts a forwarded request from processor 601-1 and sends it to the memory controller 623-1, accumulates responses from all local nodes and the memory controller 623-1, and forwards the accumulated responses and data back to the requesting processor 601-3. The cache coherence controller 621-5 also forwards a source done to the local memory controller 623-2.

The cache coherence controller 603-1 at the request cluster 600 is acting as a remote memory. As remote memory, the cache coherence controller is designed to forward a request from a processor to a proper remote cluster and ensure that local nodes are probed. In this case, the cache coherence controller 603-1 forwards a probe to cache coherence controller 621-1 at a home cluster 620. Cache coherence controller 603-2 also probes local nodes 605, 607, and 609.

The cache coherence controller 641-1 at the request cluster 640 is acting as a probing agent pair. As noted above, when a cache coherence controller acting as a probing agent pair receives a probe from a remote cluster, the cache coherence controller accepts the probe and forwards it to all local nodes. The cache coherence controller accumulates the responses and sends a final response back to the request cluster. Here, the cache coherence controller 641-1 sends a probe to local nodes associated with cache blocks 645, 647, and 649, gathers probe responses and sends the probe responses to cache coherence controller 621-3 at home cluster 620. Similarly, cache coherence controller 603-2 also acts as a probing agent pair at a request cluster 600. The cache coherence controller 603-2 forwards probe requests to local nodes including local nodes associated with cache blocks 605, 607, and 609.

The cache coherence controller 621-2 and 621-3 is also acting as an aggregate remote cache. The cache coherence controller 621-2 is responsible for accepting the probe from the memory controller 623-1 and forwarding the probe to the other processor clusters 600 and 640. More specifically, the cache coherence controller 621-2 forwards the probe to cache coherence controller 603-2 corresponding to request cluster 600 and to cache coherence controller 641-1 corresponding to remote cluster 640. As noted above, using a multiple cluster architecture may introduce delay as well as other undesirable elements such as increased traffic and processing overhead.

Figure 7:
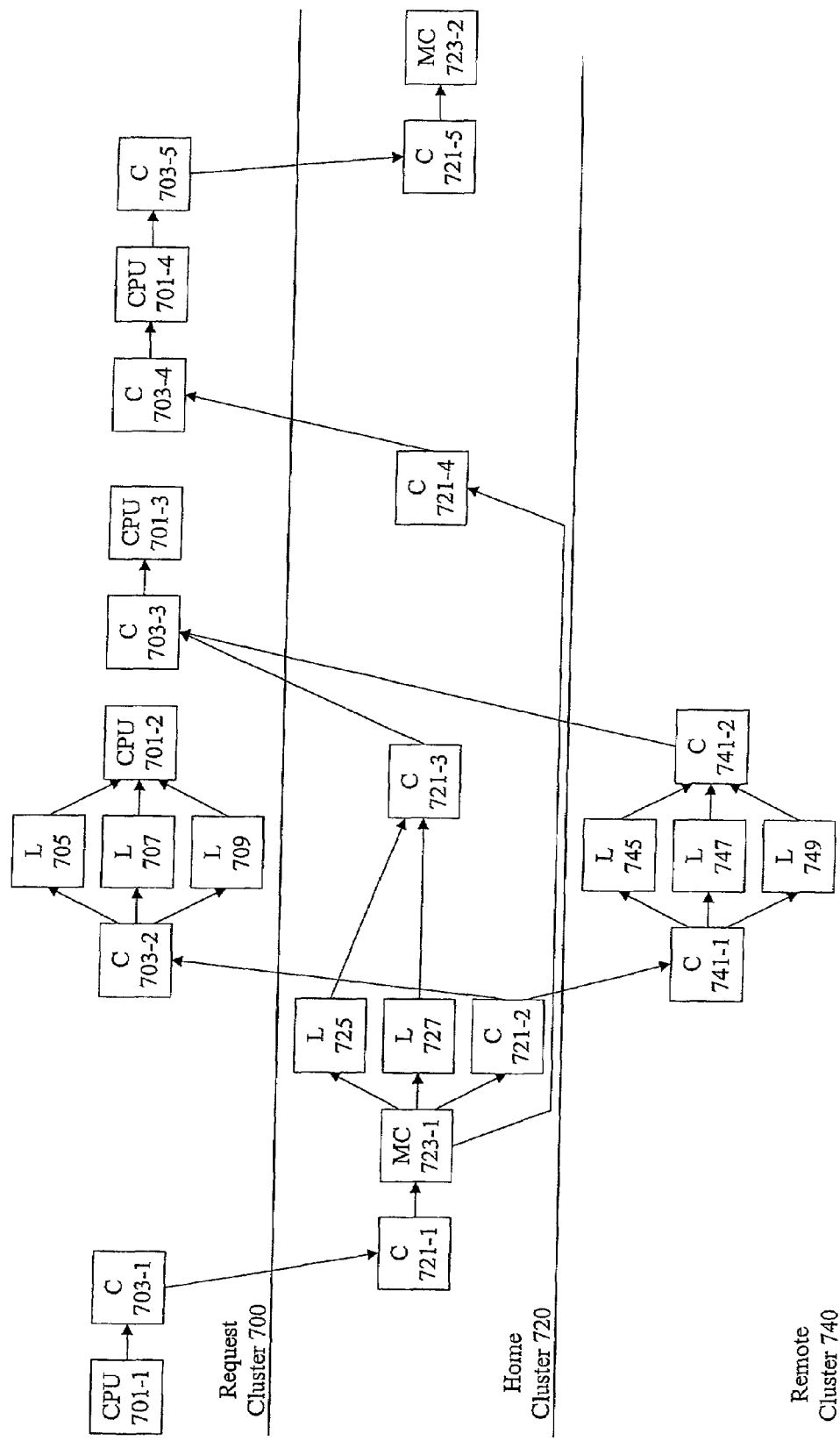
FIG. 7 is a diagrammatic representation showing a transaction flow for a remote cluster sending a probe response to a requesting cluster.

FIG. 7 is a diagrammatic representation showing one example of a mechanism for reducing data access delay associated with multiple cluster architectures. The processor 701-1 sends a request to a cache coherence controller 703-1. According to various embodiments, a determination of whether to perform speculative probing can occur at this point. In one example, if speculative probing can not be performed, the request is forwarded from the request cluster 700 to a cache coherence controller 721-1 associated with a home cluster 720. The cache coherence controller 721-1 forwards the request to memory controller 723-1. The memory controller 723-1 then proceeds to lock the memory line associated with the request and sends probes to local nodes. Cache coherence controller 721-2 sends a probe to cache coherence controller 703-2 at request cluster 700 as well as a probe to cache coherence controller 741-1 at remote cluster 740. According to various embodiments, the request and home cluster cache coherence controllers include pending buffers. Any logic or mechanism for storing information associated with transactions handled by a cache coherence controller is referred to herein as the pending buffer.

Probes are forwarded from cache coherence controller 721-2 to request cluster cache coherence controller 703-2 and remote cluster cache coherence controller 741-1. According to various embodiments, probes are forwarded from home cluster 720 to all remote clusters in the system. The cache coherence controller 721-3 receives probe responses from local nodes 725 and 727 and sends a probe response to cache coherence controller 703-3 without having to wait for probe responses from remote clusters. Remote cluster cache coherence controller 741-2 receives probe responses from local nodes 745, 747, and 749 and transmits the probe response to cache coherence controller 703-3 without having to send the probe response through the home cluster.

The cache coherence controller 703-3 gathers the probe responses from the home cluster and the remote cluster and sends a probe response to processor 701-3 as soon as all non-local probe responses are received. According to various embodiments, processor 701-3 determines that all responses have been received by knowing the number of nodes in the local cluster and the type of the initial transaction. Likewise, the coherence controllers determine the number of expected responses based on the number of clusters in the system and the type of the initial transaction. That is, the coherence controllers determine the number of responses to be transmitted to the request cluster based on the number of clusters and the type of initial transaction. In one example, all of the cache coherence controllers in the system know the number of clusters in a system. If a home cluster cache coherence controller sends probes to all three remote clusters, the request cluster cache coherence controller waits for probe responses from two remote clusters as well as a probe response from the home cluster. It should be noted that the requesting cluster need not respond to itself.

After request cluster processor 701-4 receives a memory response, a done signal is sent to the request cluster cache coherence controller 703-5 and forwarded to the home cluster cache coherence controller 721-5 to clear the pending buffers at the request and home clusters. According to various embodiments, the critical latency of remote probe responses is reduced by one hop by applying the techniques of the present invention.

According to various embodiments, in order to allow transmission of probe responses directly to a request cluster, the cache coherence controller at a home cluster manages tags used for forwarding probes. Any unit of information used to identify the source of the initial transaction and route a response to a particular destination is referred to herein as a tag. According to various embodiments, a tag includes a transaction identifier, a node identifier and a cluster identifier. When a home cluster cache coherence controller receives a cache access request from a request cluster, it typically generates a new tag from a home cluster tag space and forwards probes to remote clusters using the new tag. According to various embodiments, a probe includes a tag field. When a new tag is generated, the previous tag in the tag field is replaced with the new tag. The new tag instructs remote cluster cache coherence controllers to send probe responses back to the home cluster, as the home cluster is specified as the source in the tag. In order to direct remote clusters to send probe responses directly back to a request cluster, the home cluster places the tag of the request cluster into the forwarded probes, rather than the tag from the requesting cluster. However, in some instances the home cluster may also be the request cluster. That is, the request may have been generated from within the home cluster. In the case where the home cluster is also the request cluster, the tag used in forwarded probes is the tag from the home cluster itself.

Figure 8:
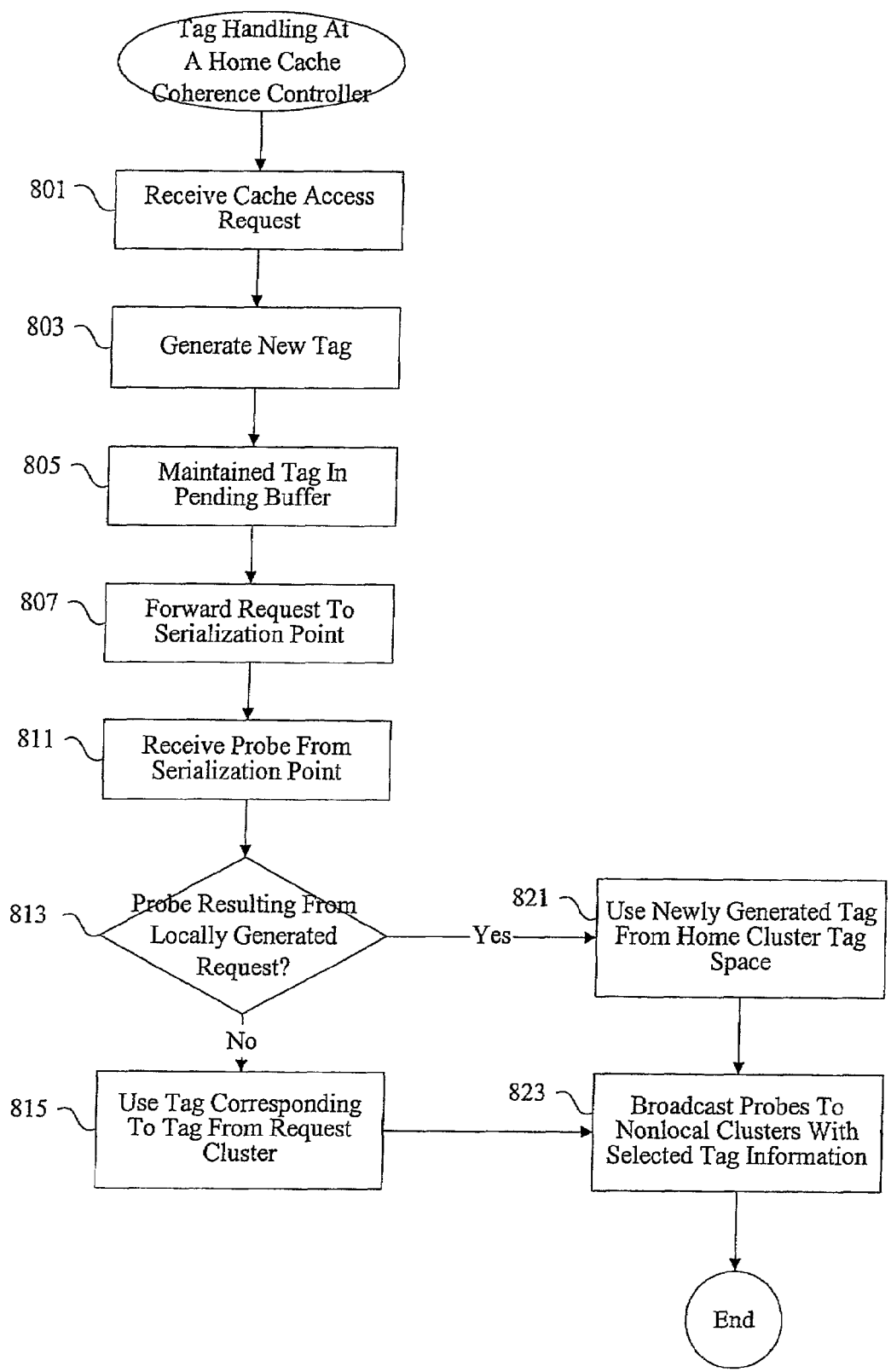
FIG. 8 is a flow process diagram showing tag management before probe transmission to remote nodes.

FIG. 8 is a flow process diagram showing one example of tag management before probe transmission to remote nodes. It should be noted that FIG. 8 is merely one example of a process that can be used to manage tags. At 801, a cache access request is received. The cache access request may include a tag from a request cluster. In one example, the tag includes an identifier of a node generating the request coupled with the identifier of the cluster generating the request. At 805, the request tag is maintained in the pending buffer associated with the home cluster cache coherence controller. At 807, the request, using the newly generated home cluster tag, is forwarded to a serialization point such as a memory controller. At 811, the probe corresponding to the request is received from a serialization point.

At 813, it is determined whether the probe resulted from a locally generated request. According to various embodiments, it is determined whether the probe resulted from a request generated by a home cluster node. In one embodiment, it can be determined whether a probe is locally generated by examining the tag of the probe. If the probe is a result of a locally generated request, the tag identifies a local processor as the source of the transactions. Consequently, a newly generated tag created from the tag space of the home cluster cache coherence controller is used at 821. By using a tag generated from the tag space of the home cluster cache coherent controller, remote node probe responses will be transmitted back to the home cluster.

If it is determined that the probe is not the result of a locally generated request, the tag corresponding to the tag from the request cluster is used at 815. In one example, the same tag is used. At 823, probes are broadcast to non-local clusters with the selected tag information. Non-local clusters here refer to any remote clusters as well as any possible request cluster. It should be noted that the steps in the above process did not have to be performed in any particular order. For example, a determination of whether the probe is a result of a locally generated requests can be made before forwarding the request to a serialization point.

Figure 9:
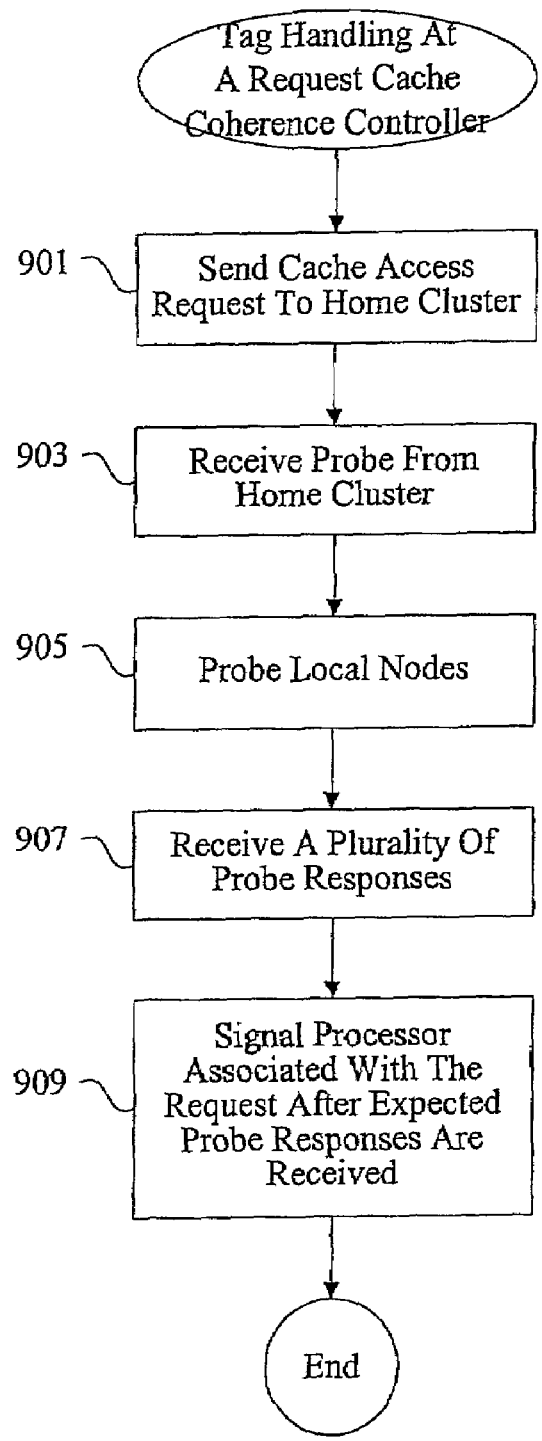
FIG. 9 is a process flow diagram showing a technique for receiving probe responses.

FIG. 9 is a process flow diagram showing one example of a technique for receiving a probe at the request cache coherence controller. At 903, the probe is received. At 905, probes are forwarded to local nodes. According to various embodiments, if the home cluster is also the request cluster, probes are forwarded to non-local clusters instead of to local nodes. At 907, probe responses are received from local as well as non-local nodes. In one embodiment, a request cluster cache coherence controller receives probe responses from remote clusters as well as the home cluster. At 909, the request cluster coherence controller forwards a single, accumulate probe response to the processor associated with the request. According to various embodiments, the cache coherence controller recognizes that all probe responses are received by identifying the number of clusters in a system and the initial transaction type. In one example, the cache coherence controller expects probe responses from all other clusters in the computer system.

Figure 10:
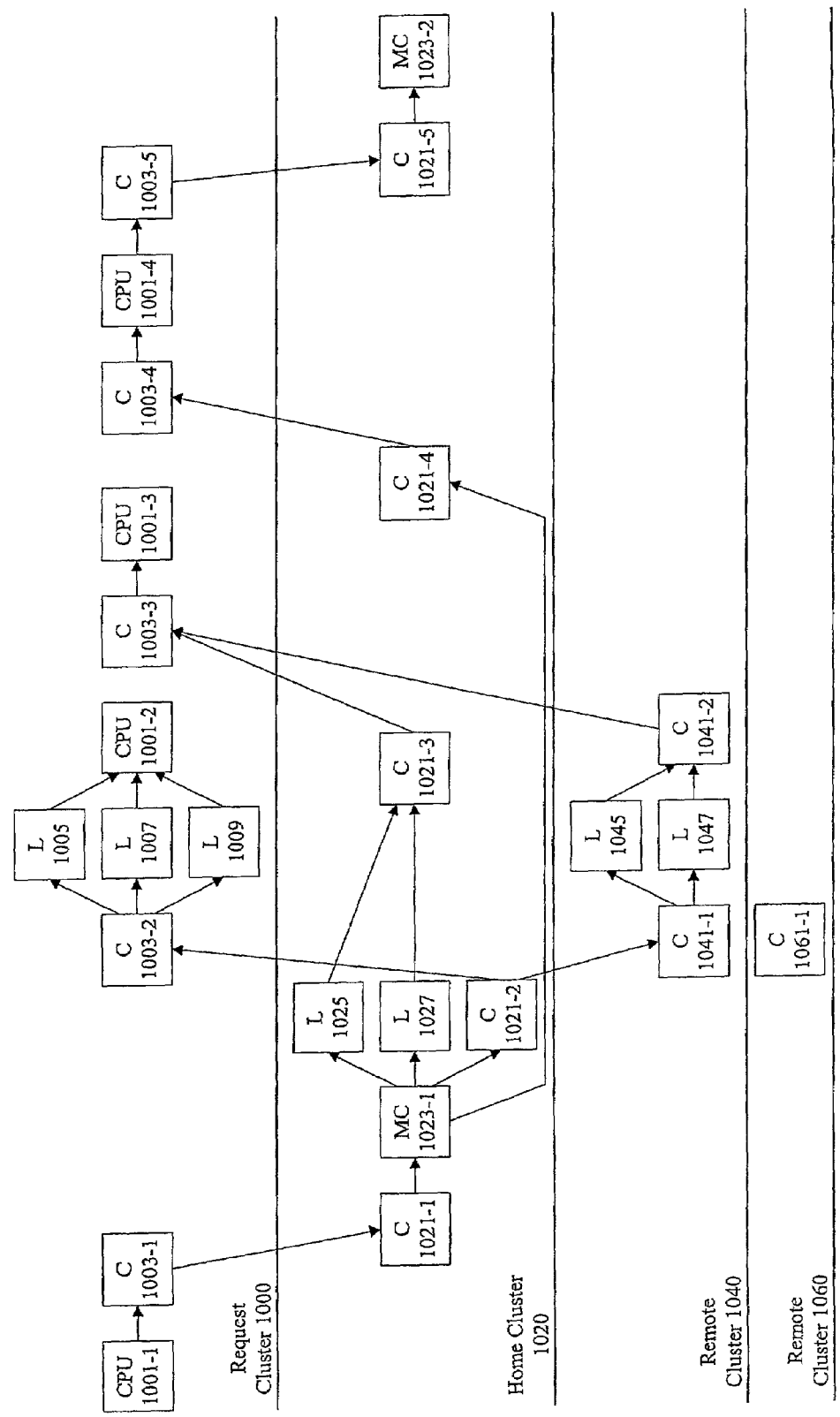
FIG. 10 is a diagrammatic representation showing a transaction flow for a remote cluster sending a probe response to a requesting cluster.

FIG. 10 is a diagrammatic representation showing one example of a mechanism for reducing data access delay associated with multiple cluster architectures by using a coherence directory. Any mechanism for determining what clusters to send probes to based on factors such as the type of transaction or remote caching of a local memory line is referred to herein as a coherence directory. In one example, a coherence directory is a list of clusters to probe indexed by memory line address.

According to various embodiments, the processor 1001-1 sends a request to a cache coherence controller 1003-1. The request is forwarded from the request cluster 1000 to a cache coherence controller 1021-1 associated with a home cluster 1020. The cache coherence controller 1021-1 forwards the request to memory controller 1023-1. The memory controller 1023-1 then proceeds to lock the memory line associated with the request and sends probes to all local nodes. Cache coherence controller 1021-2 then access a coherence directory in order to determine what clusters to forward probes to. In some instances, probes may be forwarded to all the clusters in a system including remote clusters 1040 and 1060. However, some clusters may not need to be probed based on information in the coherence directory and transaction type. In one example, the coherence directory may instruct cache coherence controller 1021-2 to forward probes to request cluster 1000 and remote cluster 1040 but not to remote cluster 1060 based on characteristics of the request. Any criteria associated with a request for selecting what clusters to send probes to are referred to herein as characteristics of a request.

Probes are forwarded from cache coherence controller 1021-2 to request cluster cache coherence controller 1003-2 and remote cluster cache coherence controller 10411. According to various embodiments, the probe forwarded to request cluster 1000 includes information for determining the number of probe responses to expect at a request cluster 1000. Information for determining the number of probe responses to expect at a request cluster is referred to herein as coherence information. In one example, the probe forwarded to request cluster 1000 includes information on how many remote clusters probes were forwarded to. The request cluster cache coherence controller then uses the information in addition to system and request characteristics to determine how many probe responses corresponding to the request to expect. The request cluster cache coherence controller uses the information in addition to system and request characteristics to determine how many probe responses will be transmitted to the request cluster.

In one example, the probe is forwarded to request cluster 1000 and remote cluster 1040. The cache coherence controller 1021-3 receives probe responses from local nodes 1025 and 1027 and sends a probe response to cache coherence controller 1003-3 without having to wait for probe responses from remote clusters. Remote cluster cache coherence controller 1041-2 receives probe responses from local nodes 1045 and 1047 and transmits the probe response to cache coherence controller 1003-3 without having to send the probe response through the home cluster.

Cache coherence controller 1003-3 gathers the probe responses from the home cluster and the remote cluster and responds to processor 1001-3 as soon as all probe responses are received. According to various embodiments, coherence controller 10033 determines that all responses have been received by using coherence information from home cluster 1020, knowledge of the total possible number of responses, and a count of responses actually received. In one embodiment, the cache coherence controller 1021-3 accesses its associated coherence directory to determine that probes were transmitted to request cluster 1000 and remote cluster 1040 but not to remote cluster 1060. Other processes can occur as described in FIG. 7.

According to various embodiments, the critical latency of remote probe responses is not only reduced by one hop, but filtering of probes and probe responses is enabled by management of the expected response count. This provides not only critical latency improvements but also allows for the reduction in the amount of traffic and processing resources needed for probing nodes in a computer system with a coherence directory. According to various embodiments, the cache coherence controller at a home cluster manages tags used for identifying transactions and forwarding transactions and responses to allow transmission of probe responses directly to a request cluster.

Figure 11:
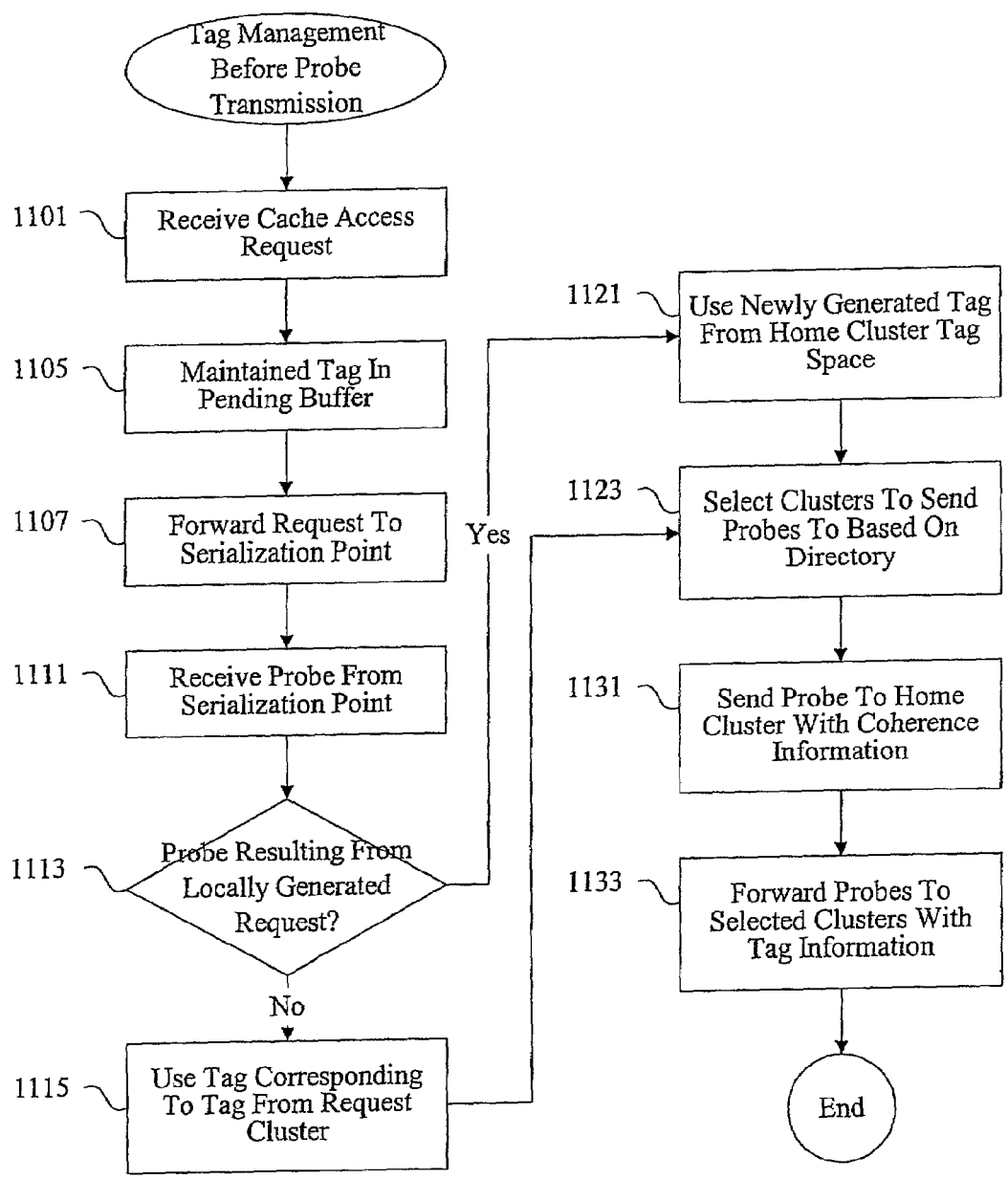
FIG. 11 is a flow process diagram showing tag management before probe transmission to remote nodes in a system with a coherence directory.

FIG. 11 is a flow process diagram showing one technique for tag management before probe transmission to remote nodes. At 1101, the cache access request is received. At 1105, any tag associated with the cache access request is maintained in the pending buffer. At 1107, the request is forwarded to a serialization point. At 1111, the cache coherence controller receives a probe from the serialization point. At 1113, the cache coherence controller determines whether the probe resulted from a locally generated request. If the probe resulted from a locally generated request, a newly generated tag produced using the home cluster tag space is used at 1121. Otherwise the tag corresponding to the tag from the request cluster or the request tag itself is used at 1115. At 1123, the coherence directory is accessed in order to determine what clusters to send probes to. According to various embodiments, clusters are selected based on characteristics of a request and the location of cached copies of the requested memory line. In one example if the request is a write request, probes are not sent to a particular cluster that does not have the memory line cached in a local processor cache. At 1131, the probe including coherence information is transmitted to the request cluster. In one example, the probe includes a value indicating the number of remote clusters probed by the home cluster. At 1133, probes are forwarded to selected clusters with the selected tag information.

Figure 12:
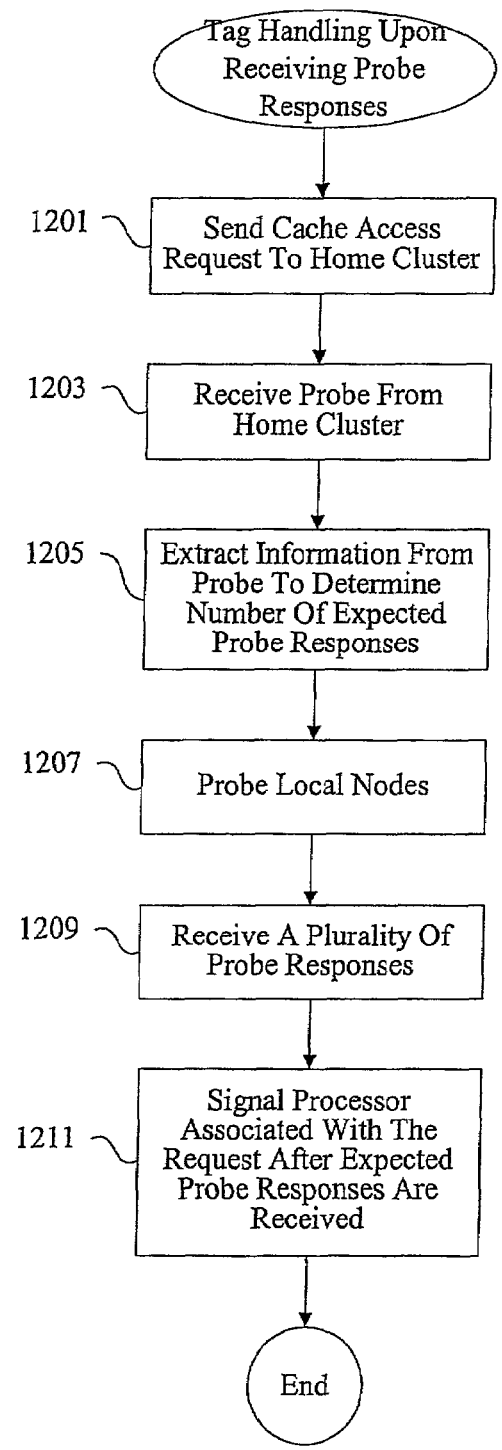
FIG. 12 is a process flow diagram showing a technique for receiving probe responses in a system with a coherence directory.

FIG. 12 is a flow process diagram showing tag management upon receiving probe responses. At 1201, a cache access request is sent to a home cluster. At 1203, the probe is received from the home cluster. According to various embodiments, the probe includes context information to allow a request cluster to determine how many probe responses to expect from remote nodes. At 1205, information from the probe is extracted in order to determine the number of expected probe responses. At 1207, local nodes are probed. At 1209, a plurality of probe responses are received. At 1211, the request cache coherence controller responds to the requesting processor associated with the request after the expected number of probe responses are received.

In one example, the expected number of probe responses is determined by initially setting a response counter in the request cluster to the maximum number of responses possible for a given transaction type. Any mechanism at a request cluster for tracking the number of expected probe responses corresponding to a request is referred to herein as a response counter. In this example, a probe from a home cluster transmitted to the request cluster includes the number of clusters to which probes are not transmitted. In a particular example, the total number of clusters in a system is four and the response counter may initially be set to three. If the probe indicates that one cluster is not being probed, the response counter would be decremented from three to two. Each time the request cluster receives a probe response, the response counter would again be decremented. A final accumulated response would be transmitted to the processor associated with the request when the counter reaches zero. It should be noted, however, that a variety of counter values, flags, increments, and decrements can be used to track the number of expected probe responses to implement the techniques of the present invention.

While the invention has been particularly shown and described with reference to specific embodiments thereof, it will be understood by those skilled in the art that changes in the form and details of the disclosed embodiments may be made without departing from the spirit or scope of the invention. For example, embodiments of the present invention may be employed with multiple processor clusters connected through a point-to-point, switch, or bus architecture. In another example, multiple clusters of processors may share a single cache coherence controller, or multiple cache coherence controllers can be used in a single cluster. Therefore, the scope of the invention should be determined with reference to the appended claims.

What is claimed is:

1. A computer system, comprising:
a home cluster including a first plurality of processors and a home cache coherence controller, the first plurality of processors and the home cache coherence controller interconnected in a point-to-point architecture;
a request cluster including a second plurality of processors and a request cache coherence controller, the second plurality of processors and the request cache coherence controller interconnected in a point-to-point architecture, the request cache coherence controller configured to receive a cache access request from a request processor and forward the request to the home cache coherence controller;
wherein the home cache coherence controller is configured to send a probe to N remote cache coherence controllers in N remote clusters upon receiving the cache access request from the request cache coherence controller, wherein the probe includes a data value corresponding to N for the request cache coherence controller to determine the number of probe responses corresponding to the cache access request to be transmitted directly from a plurality of remote cache coherence controllers to the request cache coherence controller, wherein the home cache coherence controller extracts the value of N included in the probe received from the home cache coherence controller and signals the request processor after receiving responses from local nodes and the expected number of responses from remote cache coherence controllers.

2. The computer system of claim 1, wherein the request cache coherence controller signals a processor associated with the cache access request after the expected number of probe responses are received.

3. The computer system of claim 2, wherein the request cache coherence controller includes a response counter.

4. The computer system of claim 3, wherein the request cache coherence controller signals the processor when the response counter reaches a predetermined value.

5. The computer system of claim 3, wherein N is calculated using a filtered count corresponding to a reduced number of probes to be sent to the plurality of remote cache coherence controllers and a reduced number of probe responses to be transmitted directly from the plurality of remote cache coherence controllers to the request cache coherence controller.

6. The computer system of claim 5, wherein the filtered count is used to adjust the response counter.

7. The computer system of claim 5, wherein the filtered count corresponds to the type of transaction associated with the request.

8. The computer system of claim 5, wherein the filtered count corresponds to the number of probes sent to remote clusters.

9. The computer system of claim 1, wherein the cache access request includes a first tag identifying the request cluster and a node in the request cluster.

10. The computer system of claim 9, wherein the probe includes a second tag identifying the request cluster and the node in the request cluster.

11. The computer system of claim 10, wherein the second tag is included in the probe after the home cache coherence controller accesses a pending buffer.

12. The computer system of claim 11, wherein the second tag is an instance of the first tag.

13. The computer system of claim 11, wherein the second tag and the first tag occupy the same tag field.

14. The computer system of claim 9, wherein the probe is associated with the memory line corresponding to the cache access request.

15. The computer system of claim 9, wherein the probe is sent after the cache access request is ordered at a serialization point in the home cluster.

16. A method for managing data access, comprising:
transmitting a request to a home cluster comprising a plurality of processors coupled to a home cache coherence controller, the request received from one of a plurality of request processors in a request cluster;
receiving a probe from the home cluster, the probe corresponding to the request and including a data value N corresponding to the number of probes sent to a plurality of remote clusters, the data value N for determining the number of expected probe responses to be transmitted directly from the plurality of remote clusters to a request cluster instead of from the plurality of remote clusters to the home cluster;
receiving at a request cluster a plurality of probe responses directly transmitted from the plurality of remote clusters, the plurality of probe responses corresponding to the request;
receiving a plurality of probe responses from the plurality of request cluster nodes
signaling the request processor after receiving the plurality of probe responses from the plurality of request cluster nodes and the expected number of probe responses from the plurality of remote clusters.

17. The method of claim 16, wherein the plurality of probe responses comprise probe responses from the home cluster and a remote cluster.

18. The method of claim 17, further comprising:
receiving a request response corresponding to the request from the home cluster.

19. The method of claim 16, further comprising signaling a processor associated with the cache access request after the all the expected probe responses are received if receiving the expected probe responses occurs after the probe corresponding to the request is received.

20. The method of claim 16, further comprising probing local nodes and signaling a processor associated with the cache access request after the probe corresponding to the request is received if receiving the probe corresponding to the request occurs after receiving the probe responses.

21. The method of claim 16, further comprising altering a response counter associated with the home cluster when the probe corresponding to the request is received.

22. The method of claim 21, wherein the response counter is decremented by a filtered count included in the response when the response is received.

23. The method of claim 21, further comprising altering a response counter when a probe response corresponding to the request is received.

24. The method of claim 23, wherein the response counter is decremented by one when a probe response corresponding to the request is received.

25. The method of claim 21, further comprising signaling a processor associated with the request after the response counter reaches a predetermined value.

26. An apparatus for managing data access, comprising:
means for transmitting a request to a home cluster comprising a plurality of processors coupled to a home cache coherence controller, the request received from one of a plurality of request processors in a request cluster;
means for receiving a probe from the home cluster, the probe corresponding to the request and including a data value N corresponding to the number of probes sent to a plurality of remote clusters, the data value N for determining the number of expected probe responses to be transmitted directly from the plurality of remote clusters to a request cluster instead of from the plurality of remote clusters to the home cluster;

means for receiving at a request cluster a plurality of probe responses directly transmitted from the plurality of remote clusters, the plurality of probe responses corresponding to the request;

means for receiving a plurality of probe responses from the plurality of request cluster means for signaling the request processor after receiving the plurality of probe responses from the plurality of request cluster nodes and the expected number of probe responses from the plurality of remote clusters.

27. The apparatus of claim 26, wherein the plurality of probe responses comprise probe responses from the home cluster and a remote cluster.

28. The apparatus of claim 27, further comprising:
receiving a request response corresponding to the request from the home cluster.

29. The apparatus of claim 26, further comprising signaling a processor associated with the cache access request after the all the expected probe responses are received if receiving the expected probe responses occurs after the probe corresponding to the request is received.

30. The apparatus of claim 26, further comprising probing local nodes and signaling a processor associated with the cache access request after the probe corresponding to the request is received if receiving the probe corresponding to the request occurs after receiving the probe responses.

31. The apparatus of claim 26, further comprising altering a response counter associated with the home cluster when the probe corresponding to the request is received.

32. The apparatus of claim 31, wherein the response counter is decremented by a filtered count included in the response when the response is received.

33. The apparatus of claim 31, further comprising altering a response counter when a probe response corresponding to the request is received.

34. The apparatus of claim 33, wherein the response counter is decremented by one when a probe response corresponding to the request is received.

35. The apparatus of claim 31, further comprising signaling a processor associated with the request after the response counter reaches a predetermined value.

* * * * *